United States Patent
Yie et al.

(10) Patent No.: US 9,043,849 B2
(45) Date of Patent: May 26, 2015

(54) METHOD FOR LINKING MMT MEDIA AND DASH MEDIA

(71) Applicant: HUMAX CO., LTD., Seongnam (KR)

(72) Inventors: Chung Ku Yie, Incheon (KR); Yong Jae Lee, Seoul (KR)

(73) Assignee: HUMAX HOLDINGS CO., LTD., Yongin (KR)

( * ) Notice: Subject to any disclaimer, the term of this patent is extended or adjusted under 35 U.S.C. 154(b) by 0 days.

(21) Appl. No.: 14/360,224

(22) PCT Filed: Nov. 26, 2012

(86) PCT No.: PCT/KR2012/010061
§ 371 (c)(1),
(2) Date: May 22, 2014

(87) PCT Pub. No.: WO2013/077698
PCT Pub. Date: May 30, 2013

(65) Prior Publication Data
US 2014/0325572 A1    Oct. 30, 2014

(30) Foreign Application Priority Data

Nov. 25, 2011  (KR) .................. 10-2012-0124608
Nov. 26, 2012  (KR) .................. 10-2012-0134617

(51) Int. Cl.
| | | |
|---|---|---|
| *H04N 7/16* | (2011.01) | |
| *H04N 21/2343* | (2011.01) | |
| *H04H 60/73* | (2008.01) | |
| *H04N 21/214* | (2011.01) | |
| *H04N 21/2665* | (2011.01) | |
| *H04N 21/41* | (2011.01) | |
| *H04N 21/4402* | (2011.01) | |

(Continued)

(52) U.S. Cl.
CPC ........... *H04N 21/2343* (2013.01); *H04H 60/73* (2013.01); *H04N 21/2143* (2013.01); *H04N 21/2665* (2013.01); *H04N 21/4126* (2013.01); *H04N 21/440218* (2013.01); *H04N 21/631* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 2012/0023249 A1* | 1/2012 | Chen et al. | ............. 709/231 |
| 2013/0060958 A1* | 3/2013 | Keum et al. | ............ 709/231 |

(Continued)

FOREIGN PATENT DOCUMENTS

| | | |
|---|---|---|
| KR | 10-0825755 B1 | 4/2008 |
| KR | 10-2011-0053180 A | 5/2011 |

(Continued)

OTHER PUBLICATIONS

International Search Report for PCT/KR2012/010061 filed Nov. 26, 2012.

*Primary Examiner* — Fernando Alcon

(57) ABSTRACT

Disclosed is a method for linking MMT media and DASH media. A method for linking MMT media and DASH media comprises the steps of: generating MPD information by extracting an MPD linking information from a home media server, the MPD linking information, which has been transmitted from an MMT transmission server to an MMT, being information comparable to an MPD of DASH for interconnecting DASH and MMT; and transmitting the MPD information to a mobile terminal so that the mobile terminal can replay as DASH media by means of the MPD information.

13 Claims, 8 Drawing Sheets

(51) Int. Cl.
*H04N 21/63* (2011.01)
*H04N 21/845* (2011.01)

(56) References Cited

U.S. PATENT DOCUMENTS

| | | | |
|---|---|---|---|
| 2013/0081088 A1* | 3/2013 | Hwang et al. | 725/59 |
| 2013/0291040 A1* | 10/2013 | Rhyu et al. | 725/109 |
| 2014/0020111 A1* | 1/2014 | Wang et al. | 726/26 |
| 2014/0068690 A1* | 3/2014 | Luthra et al. | 725/110 |
| 2014/0281009 A1* | 9/2014 | Moorthy et al. | 709/231 |
| 2014/0298157 A1* | 10/2014 | Lim et al. | 715/234 |
| 2014/0307734 A1* | 10/2014 | Luby et al. | 370/390 |
| 2014/0334504 A1* | 11/2014 | Yie et al. | 370/474 |

FOREIGN PATENT DOCUMENTS

| | | |
|---|---|---|
| KR | 10-2011-0100932 A | 9/2011 |
| KR | 10-2011-0105710 A | 9/2011 |
| KR | 10-2011-0111213 A | 10/2011 |

* cited by examiner

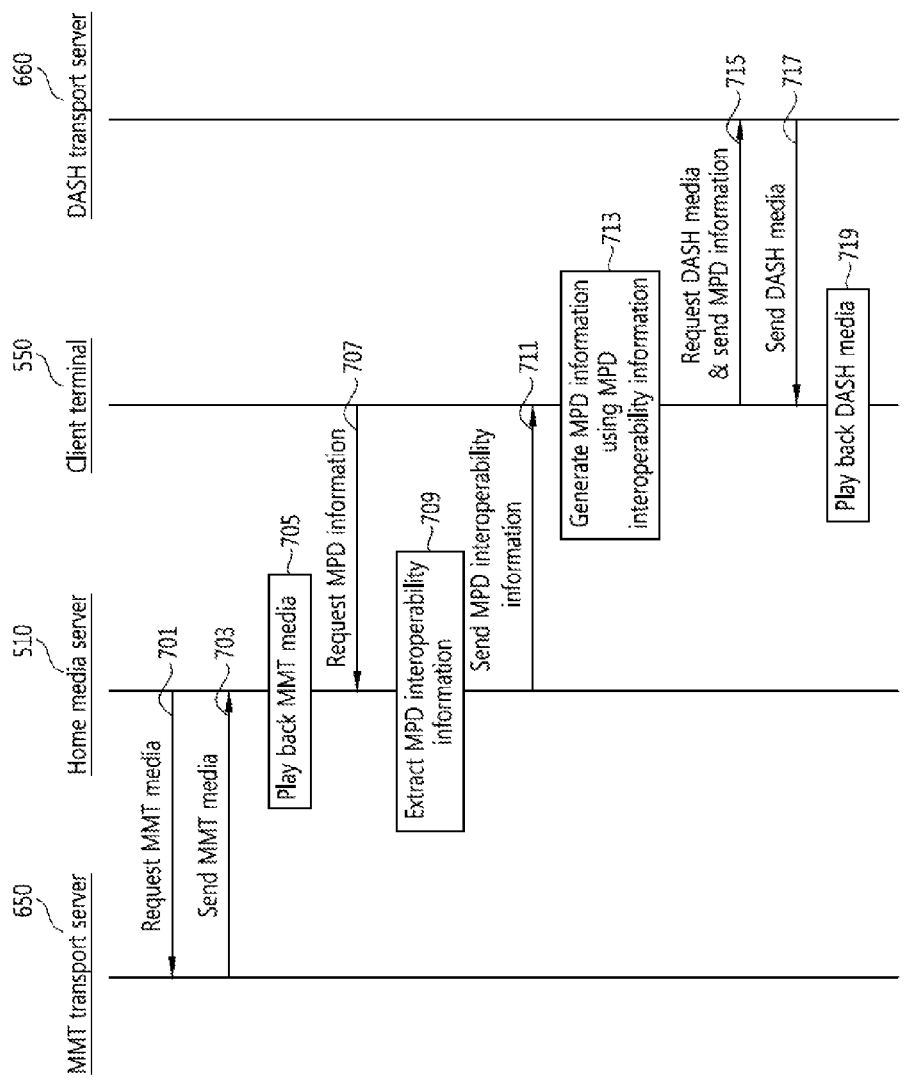

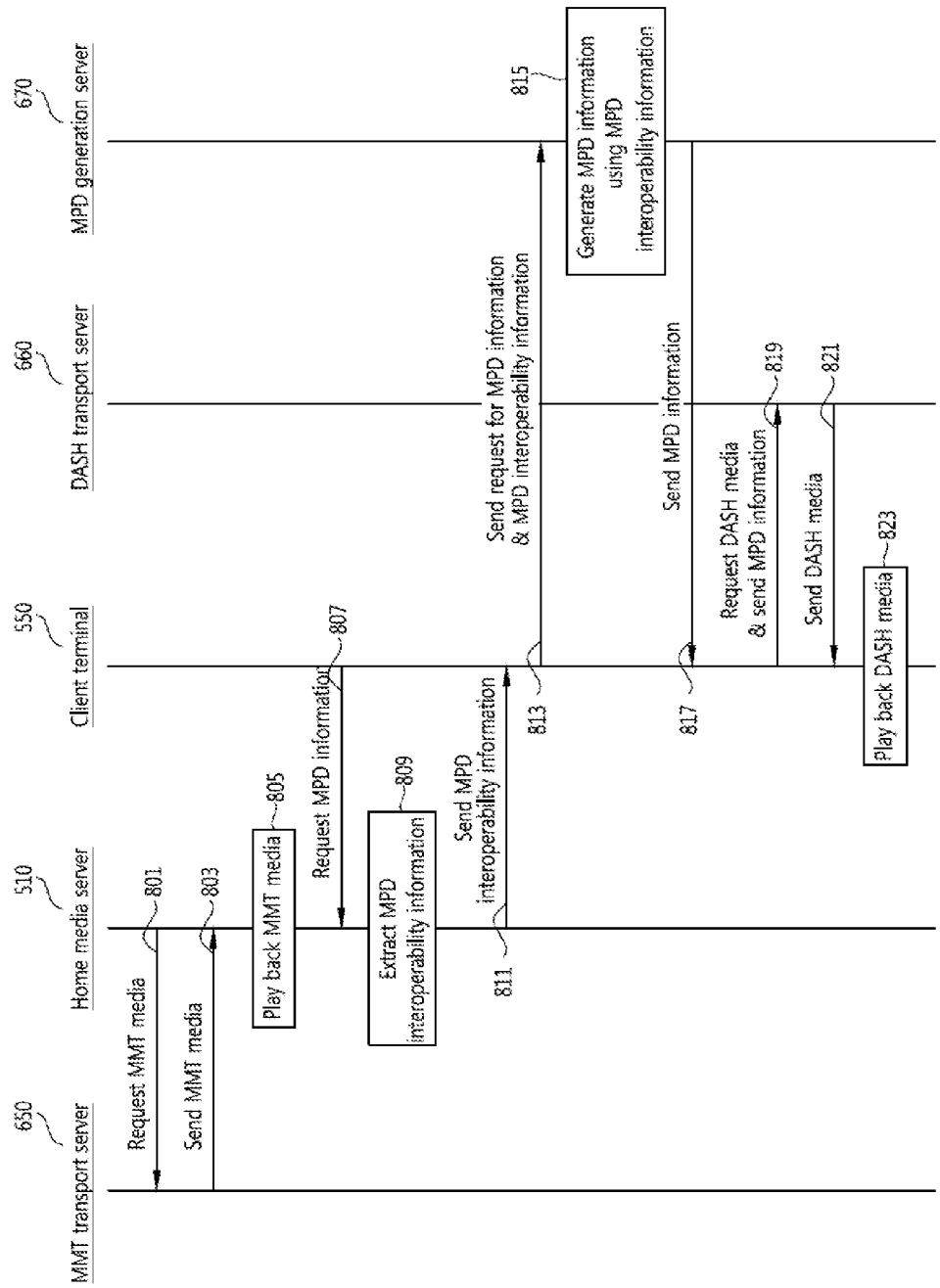

METHOD FOR LINKING MMT MEDIA AND DASH MEDIA

BACKGROUND OF THE INVENTION

1. Field of the Invention

The present invention relates to a method for interoperating MMT media and DASH media.

2. Discussion of the Related Art

New standards, such as MPEG-4, H.264/AVC, and Scalable Video Coding (SVC), for a video compression standard (or an audio compression standard) since MPEG-2 standardization have been continuously developed for the past ten years. Furthermore, each of the new standards has widened the utilization area of the MPEG standard while forming a new market, but delivery technology, such as a MPEG-2 Transport System (TS), has been widely used in digital broadcasting and mobile broadcasting (T-DMB and DVB-H) in the market during almost 20 years. Furthermore, the MPEG-2 TS is also being widely used in multimedia transmission over the Internet, that is, IPTV service, which was not taken into consideration when a standard for the MPEG-2 TS was established.

However, a multimedia transmission environment when the MPEG-2 TS was developed and a current multimedia transmission environment are experiencing a significant change. For example, the MPEG-2 TS standard was developed to transmit multimedia data over an ATM network when it was established, but today is rarely used for such an object. Furthermore, the MPEG-2 TS standard involves elements which are inefficient for recent multimedia transmission over the Internet because requirements, such as multimedia transmission using the Internet, were not taken inconsideration when the MPEG-2 TS standard was established. Accordingly, in MPEG, the establishment of a MPEG Multimedia Transport Layer (MMT), that is, a new multimedia transmission standard in which multimedia service in the Internet suitable for a changing multimedia environment is taken into consideration, has been recognized as a very important task.

As described above, the reason why MMT standardization is important lies in an urgent need for an international standard for multimedia transmission which has been optimized for recent multimedia transmission environments in various heterogeneous networks because the MPEG 2-TS standard established 20 years again has not been optimized for recent IPTV broadcasting service and Internet environments. For this reason, in MPEG, MMT standardization is in progress as a new delivery technology standard.

Meanwhile, the recent development of mobile communication technology has rapidly accelerated the popularization of mobile communication terminals and thus has changed our life so that most of common people always carry mobile communication terminals, such as mobile phones, PDAs, and smart phones. The mobile communication terminal has an effect that enables a user to access a communication network more easily and also enables the system resources of a conventional communication system to be efficiently distributed. From such technologies, there is provided streaming service in which multimedia content, such as audio content and video content, can be received and played back in real time over a wireless content communication network while being in motion with a mobile communication terminal carried. Streaming service applied to wired IPTV provides multimedia content through a Real-time Transport Protocol (RTP) or in a form in which the RTP and MPEG-2 are combined.

In the case of streaming service using a wireless method, however, if streaming service is provided through the RTP or in the form in which the RTP and MPEG-2 are combined, a problem arises. First, if multimedia content is divided into a plurality of packets and transmitted, there is a problem in that a plurality of ports according to the plurality of packets must be opened because the RTP does not support multiplexing. In particular, streaming service cannot be normally provided using the RTP in an area in which a firewall is installed.

Second, the RTP operates on the User Datagram Protocol (UDP). On the wireless Internet, the UDP divides multimedia content into a plurality of packets, sends the plurality of packets to a receiver, but does not check whether the transmitted packets have arrived at the receiver in the correct order. For this reason, a loss of packets may occur. Furthermore, if a loss of packets is generated, content may be lost because the lost content packets are not retransmitted to the receiver.

Accordingly, a method of providing streaming service using a Hyper Text Protocol (HTTP) that operates on the TCP is chiefly used in mobile communication terminals, such as smart phones. This is commonly called 'HTTP streaming'.

In general, the HTTP is a protocol used to send text, such as hypertext, and images. Thus, if multimedia content streaming service is provided using the HTTP in mobile communication terminals, such as smart phones, there is a problem in that streaming service cannot be provided in real time because the amount of multimedia content is great.

In order to provide MPEG media streaming service in mobile communication terminals, such as smart phones, Dynamic Adaptive Streaming over HTTP (DASH) standardization has almost been completed.

DASH standardization is for providing MPEG media streaming service in mobile communication terminals, such as smart phones. MMT standardization is for providing improved media (e.g., media having resolution of UHD level or higher) transport service under a dynamic network environment, such as hybrid delivery.

Some of MMT use cases may need to be supported by the DASH standard in order to transport MPEG media.

SUMMARY OF THE INVENTION

In particular, it is necessary to adopt a current DASH standard in the MMT in order to support hybrid delivery over HTTP.

An object of the present invention is to provide a method for interoperating MMT media and DASH media, for performing interoperability between the MMT media and the DASH media.

A method for interoperating MMT media and DASH media in accordance with an embodiment of the present invention for achieving an object of the present invention includes steps of generating, by a home media server, MPD information by extracting MPD interoperability information of media transmitted through MMT from a MMT transport server, wherein the MPD interoperability information is information corresponding to a MPD of DASH for interoperability between DASH and MMT and sending the MPD information to a portable terminal so that the portable terminal plays back the MMT media as DASH media using the MPD information. The MPD interoperability information may be linked to a Service Information Configuration Information Table (SICTT) that is a service configuration information table and an MMT Asset Configuration Information Table (MACIT) that is an MMT asset configuration information table which are managed in a MMT S layer (Signalling layer) and stored.

A method for interoperating MMT media and DASH media in accordance with another embodiment of the present invention includes steps of receiving, by a portable terminal, MPD interoperability information of media transmitted through MMT and extracted by a home media playback device, wherein the MPD interoperability information is information corresponding to a MPD of DASH for interoperability between DASH and MMT, generating, by the portable terminal, MPD information using the MPD interoperability information, and playing back, by the portable terminal, the MMT media as DASH media using the MPD information.

A method for interoperating MMT media and DASH media in accordance with yet another embodiment of the present invention includes steps of receiving, by a portable terminal, MPD interoperability information of media transmitted through MMT and extracted by a home media playback device, wherein the MPD interoperability information is information corresponding to a MPD of DASH for interoperability between DASH and MMT, sending, by the portable terminal, the received MPD interoperability information to an external server, generating, by the external server, MPD information using the MPD interoperability information and sending the generated MPD information to the portable terminal, and playing back, by the portable terminal, the MMT media as DASH media using the MPD information.

BRIEF DESCRIPTION OF THE DRAWINGS

FIG. 7 is a flowchart illustrating a method for transmitting content, transmitted through MMT, as DASH content under the interoperating scenario of MMT and DASH in accordance with another embodiment of the present invention.

FIG. 8 is a flowchart illustrating a method for transmitting content, transmitted through MMT, as DASH content under the interoperating scenario of MMT and DASH in accordance with yet another embodiment of the present invention.

DETAILED DESCRIPTION OF THE EMBODIMENTS

Figure 1:
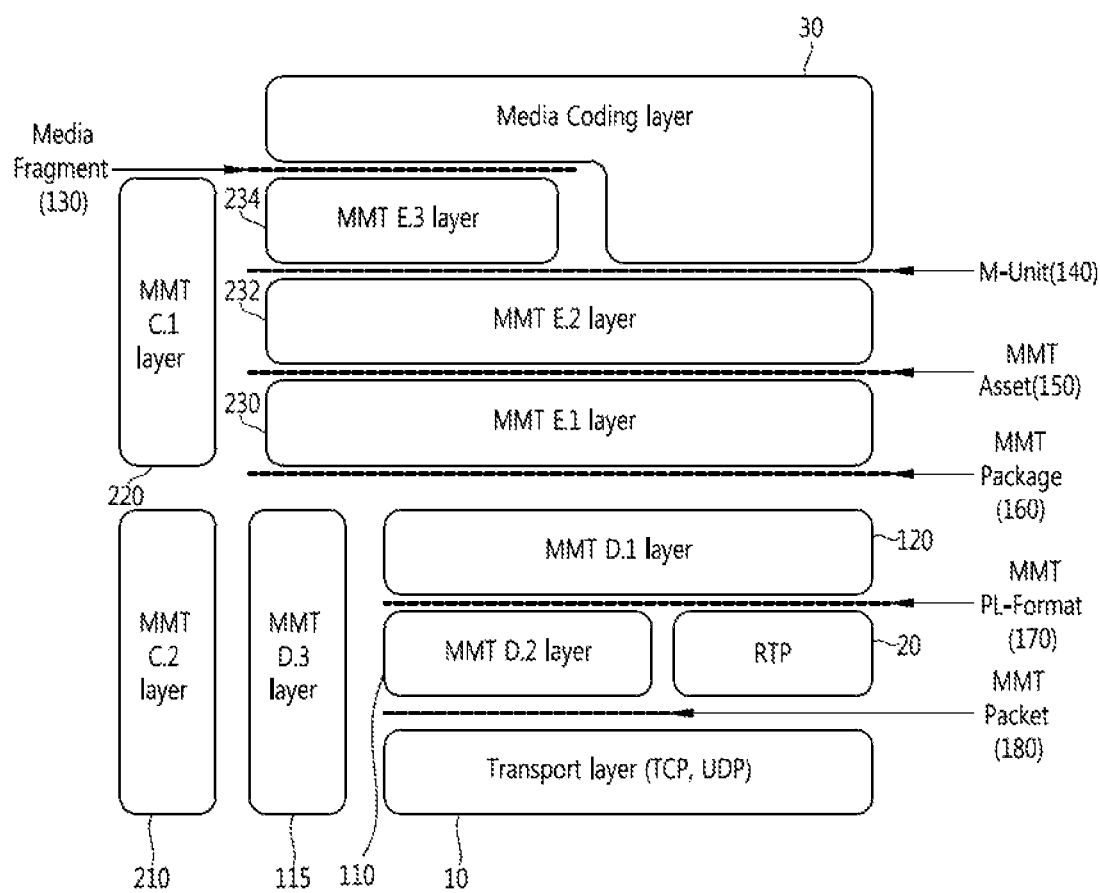
FIG. 1 is a conceptual diagram showing a MMT hierarchical structure in accordance with an embodiment of the present invention.

The present invention may be modified in various ways and may have multiple embodiments, and specific embodiments are illustrated in the drawings and are described in detail.

However, it should be understood that the present invention is not intended to be limited to the specific embodiments and the present invention includes all changes, equivalents, and substitutions that are included in the spirit and technical scope of the present invention.

Terms, such as the first and the second, may be used to describe a variety of elements, but the elements should not be limited by the terms. The terms are used to only distinguish one element from the other element. For example, a first element may be named a second element, and likewise a second element may be named a first element without departing from the scope of the present invention. A term 'and/or' includes a combination of a plurality of related and described items or any one of a plurality of related and described items.

When it is said that one element is described as being 'connected' or 'coupled' to the other element, the one element may be directly connected or coupled to the other element, but it should be understood that a third element may be interposed between the two elements. In contrast, when it is said that one element is described as being 'directly connected' or 'directly coupled' to the other element, it should be understood that a third element is not present between the two elements.

Terms used in this application are used to describe only specific embodiments and are not intended to limit the present invention. An expression of the singular number should be understood to include plural expressions, unless clearly expressed otherwise in the context. It should be understood that terms, such as 'include' or 'have', are intended to indicate the existence of a described characteristic, number, step, operation, element, part, or a combination of them, but are not intended to exclude the existence of one or more other characteristics, numbers, steps, operations, elements, parts, or a combination of them or a possibility addition of them.

All terms used herein, including technical or scientific terms, have the same meanings as those typically understood by those skilled in the art unless otherwise defined. Terms, such as ones defined in common dictionaries, should be construed as having the same meanings as those in the context of related technology and should not be construed as having ideal or excessively formal meanings unless clearly defined in this application.

Hereinafter, preferred embodiments of the present invention are described in more detail with reference to the accompanying drawings. In describing the present invention, in order to facilitate general understanding, the same reference numerals are used to denote the same elements throughout the drawings, and a redundant description of the same elements is omitted.

The meaning of terms is defined below as follows.

Non-timed data defines all data elements that are consumed without specifying time. The non-timed data may have a time range in which data is executed or started.

Timed data defines a data element associated with a specific time at which the timed data is decoded and presented.

Presentation defines an operation performed by one or more devices so that a user can experience (e.g., movie appreciation) a single content component or a single service.

Service defines one or more content components that are delivered for presentation or storage.

Service information defines metadata that describes a single service and the characteristics and components of the service.

An Access Unit (AU) is the smallest data entity and may have time information as its attributes. In relation to coded media data whose time information for decoding and presentation has not been designated, an AU is not defined.

A Media Fragment Unit (MFU) is a common container independent from any specific codec and accommodates coded media data that may be independently consumed by a media decoder. The MFU has a size smaller than or equal to an AU and accommodates information that may be used in the transport layer.

A Media Processing Unit (MPU) is a common container independent from any specific media codec and accommodates information that is related to at least one AU and additional delivery and consumption. For non-timed data, the MPU accommodates the part of data that does not belong to the range of an AU. The MPU is coded media data that may be processed completely and independently. In this context, processing means encapsulation or packetization into a MMT package for delivery.

An MMT asset is a logical data entity which is formed of at least one MPU along with the same MMT asset ID or formed of a specific data lump along with a format defined in another standard. The MMT asset is the largest data unit to which the same composition information and transport characteristics are applied.

MMT Asset Delivery Characteristics (MMT-ADC) are a description related to QoS requirements for delivering an MMT asset. The MMT-ADC is presented so that a specific delivery environment thereof is unaware.

MMT Composition Information (MMT CI) describes a spatial and temporal relationship between MMT assets.

A MMT package is a collection of logically structured data, and it includes at least one MMT asset, MMT-Composition Information (CI), MMT-ADC, and descriptive information.

A MMT packet is the format of data generated or consumed in accordance with a MMT protocol.

A MMT payload format is a format for the payload of a MMT packet or a MMT signaling message to be delivered in accordance with a MMT protocol or an Internet application layer protocol (e.g., RTP).

A content component or a media component is defined as media of a single type or a subset of media of a single type. For example, a video track, movie subtitles, or the enhancement layer of video may become a content component or a media component.

Content is defined as a set of content components. For example, a movie or a song may become content.

Hybrid delivery defines that one or more content components are delivered at the same time over physically different types of one or more networks.

Hereinafter, a first network or a second network includes various types of networks, including a broadcast network, a broadband network, a cable network, or a satellite communication network.

Hereinafter, hybrid delivery may be performed in the form of a MMT asset unit, a sub-stream unit, an MFU, an MPU, an MMT package unit, or an MMT packet unit. Furthermore, if video content is formed of a plurality of layers, such as a first layer and a second layer, hybrid delivery may be performed in the form of a layer unit.

Hereinafter, preferred embodiments of the present invention are described in more detail with reference to the accompanying drawings. In describing the present invention, in order to facilitate general understanding, the same reference numerals are used to denote the same elements throughout the drawings, and a redundant description of the same elements is omitted.

FIG. 1 is a conceptual diagram showing an MPEG Media Transport (MMT) hierarchical structure in accordance with an embodiment of the present invention.

Referring to FIG. 1, the MMT hierarchical structure includes the functional areas of an Encapsulation layer (E-layer), a Delivery layer (D-layer), and a Signaling layer (S layer). A MMT layer operates on a transport layer.

The E-layer defines the logical structure of a format of media content, a MMT package, and data units to be processed by an entity that complies with MMT. In order to provide information essential for adaptive delivery, a MMT package defines components, including media content, and a relationship between the components. The format of data units is defined to encapsulate media that has been coded so that the media is stored or delivered as the payload of a transport protocol and the media is easily converted between the data units.

The E-layer may be responsible for functions, such as the packetization, fragmentation, synchronization, and multiplexing of delivered media, for example.

Various types of multimedia components may be encapsulated and aggregated in order to be delivered and consumed by the functions provided by the E-layer. Information about encapsulated media components and the configurations of the media components is provided in the functional area of the E-layer.

Major information about encapsulated media components may include information about aggregation, prioritization, the dependency of a media fragment, and the timing and structure of a MPU, information about the ID of an MMT asset 150, initialization information, and codec information. The configuration information of media components may include information about the IDs of a MMT package 160 and the MMT asset 150, configuration information including a list of the MMT assets 150, the composition information 162 of MMT assets 150 within the MMT package 160, and transport characteristics information 164.

The E-layer, as shown in FIG. 1, may include a MMT E.1 layer, a MMT E.2 layer, and a MMT E.3 layer.

The MMT E.3 layer encapsulates a Media Fragment Unit (MFU) provided by a media codec (A) layer and generates a Media Processing Unit (MPU).

Coded media data from a higher layer is encapsulated into an MFU. The type and value of coded media are abstracted so that an MFU can be commonly used in specific codec technology. In such a case, a lower layer can process an MFU without accessing encapsulated coded media, and the lower layer fetches required coded media data from a network or the buffer of a repository and sends the coded media data to a media decoder. The MFU has an information media part unit enough to perform the above operation.

An MFU is independent from a specific codec and may have a format on which a data unit that may be independently consumed by a media decoder can be carried. For example, a picture or slice of video may become an MFU.

A single MFU or a group of a plurality of MFUs that may be independently delivered and decoded generate an MPU. Non-timed media that may be independently delivered and executed also generates an MPU. An MPU describes an internal structure, such as the arrangement and pattern of an MFU, thus enabling rapid access to and the partial consumption of the MFU.

The E.2 layer encapsulates an MPU generated by the E.3 layer and generates an MMT asset.

A sequence of MPUs from the same source component generates an MMT asset. An MMT asset is packaged by a MMT package, differently configured according to Composition Information (CI) and Transport Characteristics (TC), multiplexed with other MMT assets in accordance with a MMT payload format, and delivered in accordance with an MMT protocol.

An MMT asset is a data entity formed of a single MPU or a plurality of MPUs from a single data source and is a data unit in which Composition Information (CI) and Transport Characteristics (TC) are defined. An MMT asset may correspond to Packetized Elementary Streams (PES) and may correspond to, for example, video, audio, program information, a MPEG-U widget, a JPEG image, a MPEG 4 file format, a MPEG Transport Stream (M2TS), etc.

The E.1 layer encapsulates an MMT asset generated by the E.2 layer and generates a MMT package.

An MMT asset is packaged with MMT-CI for a subsequent response from the same user experience along with or separately from other function areas—a transport area and a signal area—. The MMT package is also packaged with Transport Characteristics (TC) on which a proper delivery method for each MMT asset is selected so that quality of experience of the MMT asset is satisfied.

A MMT package, together with supplementary information, such as Composition Information (CI) and Transport Characteristics (TC), may be formed of one MMT asset or a plurality of MMT assets. The MMT package may correspond to the program of a MPEG-2 TS.

Composition Information (CI) includes information about a relationship between MMT assets. If a single piece of content is formed of a plurality of MMT packages, the Composition Information (CI) may further include information for indicating a relationship between the plurality of MMT packages.

Transport Characteristics (TC) may include Transport Characteristics information necessary to determine the delivery conditions of an MMT asset or MMT packet and may include, for example, a traffic description parameter and a QoS descriptor.

The D-layer defines the application layer protocol and format of a payload. The payload format is defined to deliver coded media data irrespective of a media type or an encoding method.

The D-layer may perform network flow multiplexing, network packetization, and QoS control of media that is delivered, for example, over a network.

The D-layer is responsible for the multiplexing and packet-level aggregation and/or fragmentation of media, such as video and audio transmitted over a network, network packetization, QoS control, and synchronization functions, and an interface with the transport layer, such as an existing RTP, the transport layer, such as existing UDP and TCP, the E-layer, and the S layer, between the transport layer and the E-layer.

The D-layer identifies different types of payloads from the E-layer in order to handle the payloads from the E-layer.

The D-layer may handle a temporal relationship between packets that are delivered over different networks and through different channels. The synchronization function may include hybrid network synchronization using a timestamp, etc.

The D-layer may handle the timing constraints of MMT delivery packets for real-time media delivery.

The D-layer may perform error control of a MMT media packet, such as forward error correction and retransmission.

The D-layer may perform flow control of a MMT media packet.

The D-layer may perform an interaction with other MMT layers in addition to lower layers (MAC, PHY) through the cross-layer design in order to maintain a specific level of QoS for the delivery of a MMT media packet.

Furthermore, the D-layer may provide a function for performing group communication.

As shown in FIG. 1, the D-layer may include a MMT D.1 layer, a MMT D.2 layer, and a MMT D.3 layer.

The D.1 layer receives a MMT package generated by the E.1 layer and generates a MMT payload format. The MMT payload format is a payload format for delivering an MMT asset and delivering information for consumption in accordance with an existing other application transport protocol, such as a MMT application protocol or RTP. The MMT payload may include the fragments of an MFU along with information, such as AL-FEC.

The D.2 layer receives a MMT payload format generated by the D.1 layer and generates am MMT transport packet or a MMT packet. The MMT transport packet or the MMT packet is a data format used in an application transport protocol for MMT.

The D.3 layer supports QoS by providing a function capable of exchanging pieces of information between layers through the cross-layer design. For example, the D.3 layer may perform QoS control using the QoS parameters of the MAC/PHY layer. For example, a bit rate, a packet loss ratio, expected delay, and an available buffer size may become the QoS parameters of the MAC/PHY layer.

The S layer performs a signaling function. The S layer may perform, for example, the session initialization/control/management of delivered media, trick mode based on a server and/or a client, service discovery, synchronization, and a signaling function for an interface function between other layers, that is, the D-layer and the E-layer. The synchronization may include synchronization control in a hybrid network.

The S layer defines the formats of messages which manage the delivery and consumption of a MMT package. The message for consumption management is used to deliver the structure of a MMT package, and the message for delivery management is used to deliver the structure of a payload format and the construction of a protocol.

As shown in FIG. 1, the S layer may include a MMT S.1 layer and a MMT S.2 layer.

The S.1 layer may perform service discovery, media session initialization/termination, media session presentation/control, an interface function with the D layer and the E layer, etc. The S.1 layer may define the format of control messages between applications for media presentation session management. The presentation session management may define the formats of control messages that are exchanged between applications in order to provide information required for media presentation, session management, and media consumption.

The S.2 layer may perform delivery session management. The delivery session management may define the formats of control messages exchanged between the delivery end-points of the D-layer regarding flow control, delivery session management, delivery session monitoring, error control, and hybrid network synchronization control.

The S.2 layer may include delivery session establishment and release, delivery session management (e.g., delivery session monitoring, flow control, and error control), resources reservation for a set delivery session, signaling for synchronization under a complex delivery environment, and signaling for adaptive delivery in order to support the operations of the D-layer. The S.2 layer may provide signaling necessary between a sender and a receiver. That is, the S.2 layer may provide necessarily signaling between a sender and a receiver in order to support the above mentioned operations of the D-layer. Furthermore, the S.2 layer may be responsible for an interface function with the D-layer and the E-layer.

A control message (or control information) may be generated by the signaling layer (S-layer) and be transmitted over a broadcast network and/or a broadband network.

If a control message is transmitted over both a broadcast network and a broadband network, the function of the control message transmitted over the broadcast network may be identical with the function of the control message transmitted over the broadband network. The syntax and format of a control message may be different depending on applications and the type of delivery. For example, in the case of hybrid delivery, the same common control information and the same common format may be used in control messages transmitted over a broadcast network and a broadband network respectively. Alternatively, in the case of hybrid delivery, the same common control information (common control information) may be transmitted in different formats over a broadcast network and a broadband network. Alternatively, in the case of hybrid delivery, different pieces of control information may be transmitted in different formats and as different control information over a broadcast network and a broadband network.

Figure 2:
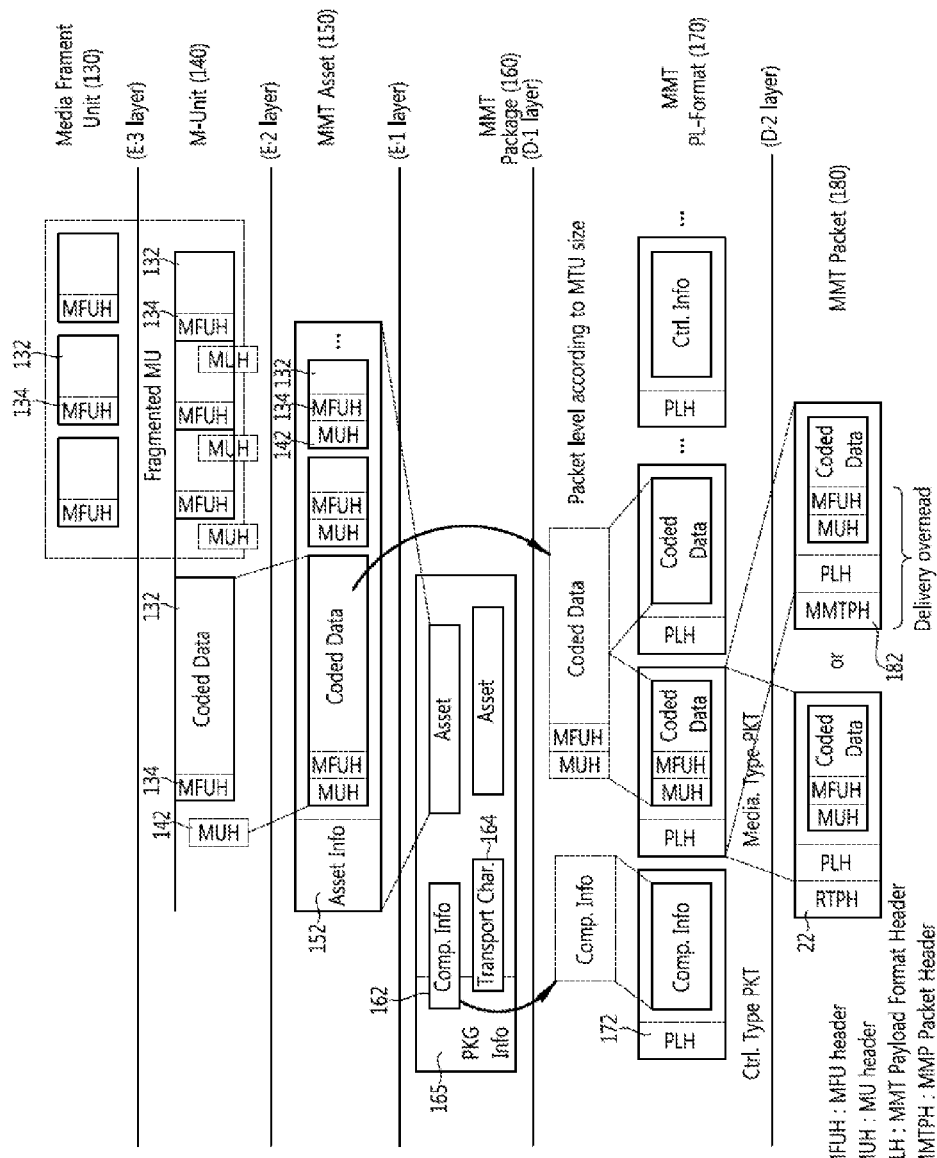
FIG. 2 shows the format of unit information (or data or a packet) used in each layer of the MMT hierarchical structure of FIG. 1.

FIG. 2 shows the format of unit information (or data or a packet) used in each layer of the MMT hierarchical structure of FIG. 1.

A Media Fragment Unit (MFU) defines a format on which a transport layer encapsulates the portion of an AU in order to perform adaptive delivery in the range of the MFU. The MFU may be used to deliver a specific format of coded media so that the portion of the AU is independently decoded or discarded.

The MFU 130 includes coded media fragment data 132 and a Media Fragment Unit Header (MFUH) 134. The MFU 130 has a general container format independent from a specific codec and carries the smallest data unit that may be independently consumed by a media decoder. The MFUH 134 may include supplementary information, such as media characteristics, for example, a loss tolerance. For example, the picture or slice of video may become the MFU 130.

The MFU has an identifier for distinguishing one MFU from other MFUs and includes common relationship information between MFUs within a single AU. A dependent relationship between the MFUs in a single AU is described, and prioritization related to the MFUs is described as the part of such pieces of information. The information may be used to handle delivery in a lower transport layer. For example, in a transport layer, the delivery of MFUs that may be discarded may be omitted in order to support the delivery of QoS in an insufficient bandwidth.

The MPU is a set of MFUs including a plurality of the MFUs 130. The MPU has a general container format independently from a specific codec and includes media data equivalent to an access unit. The MPU may have a timed data unit or a non-timed data unit. The MPU may include a Media Processing Unit Header (MPUH) having MFU data and supplementary information, such as a timestamp for synchronization.

The MPU is data processed by an entity that complies with MMT independently and completely, and the processing includes encapsulation and packetization. The MPU may be formed of at least one MFU or may have the part of data having a format defined by another standard.

A single MPU may accommodate the integral number of at least one AU or non-timed data. For the timed data, the AU may be delivered by at least one MFU, but a single AU cannot be fragmented into a plurality of MPUs. In non-timed data, a single MPU accommodates the part of non-timed data processed by an entity that complies with MMT independently and completely.

The MPU may be uniquely identified by a sequence number and an asset ID, associated with the MPU and used to distinguish the MPU from other MPUs, within a MMT package.

The MPU has at least one random access point. The first byte of an MPU payload may always start from a random access point. In timed data, the fact means that the decoding sequence of the first MFU is always 0 in an MPU payload. In timed data, the presentation duration and decoding sequence of each AU may be sent to be indicative of a presentation time. The MPU does not have its own initial presentation time, and the presentation time of the first AU of a single MPU may be described in Composition Information (CI). The Composition Information (CI) may specify the first presentation time of the MPU.

The MMT asset 150 is a set of MPUs formed of a plurality of MPUs. The MMT asset 150 is a data entity made up of a plurality of MPUs (timed or non-time data) from a single data source, and MMT asset information 152 may include asset packaging metadata and supplementary information, such as a data type. The MMT asset 150 may include, for example, video, audio, program information, a MPEG-U widget, a JPEG image, a MPEG 4 File Format (FF), Packetized Elementary Streams (PES), and a MPEG Transport Stream (M2TS).

Furthermore, the MMT asset may be a logical data entity having coded media data. The MMT asset has an MMT asset header and coded media data. The coded media data may be a group of MPUs that are collectively referred by the same MMT asset ID. The data of a type that is consumed by an entity directly related to a MMT client may be a separated MMT asset. Such data types may include, for example, a MPEG-2 TS, a PES, a MP4 file, a MPEG-U widget package, and a JPEG file.

The coded media of the MMT asset may be timed data or non-timed data. The timed data is audiovisual media data that needs the synchronized decoding and presentation of specific data on a designated time. The non-timed data is the data of a data type that may be decoded and provided on a specific time in response to the providing of service or a user interaction.

A service provider may generate multimedia service by aggregating MMT assets in the state in which the MMT assets are placed on a space-time axis.

The MMT package 160 is one MMT asset or a set of MMT assets including one or more MMT assets 150. MMT assets within a MMT package may be multiplexed or may be concatenated like a chain.

The MMT package is a container format for an MMT asset and configuration information. The MMT package provides the repository of an MMT asset for a MMT program and configuration information.

A MMT program provider encapsulates coded data as an MMT asset, describes the temporal and spatial layout of the MMT assets and Transport Characteristics (TC) thereof, and generates configuration information. An MU and an MMT asset may be directly delivered in the form of the D.1 payload format. The configuration information may be delivered by an S.1 presentation session management message. However, a MMT program provider and a client that permit the relay or subsequent reuse of a MMT program stores the configuration information in the form of a MMT package format.

In parsing a MMT package, a MMT program provider determines that an MMT asset may provide a client with what transport path (e.g., broadcast or broadband). Configuration information in a MMT package is delivered as a S.1 presentation session management message along with delivery-related information.

The client receives the S.1 presentation session management message and knows what MMT program is possible and how an MMT asset for a corresponding MMT program is received.

A MMT package may also be delivered in accordance with the D.1 payload format. The MMT package is packetized in accordance with the D.1 payload format and delivered. A client receives the packetized MMT package and configures part of or the entire MMT package. In this case, the client consumes a MMT program.

The package information 165 of the MMT package 160 may include configuration information. The configuration information may include supplementary information, such a list of MMT assets, package identification information, Composition Information (CI) 162, and Transport Characteristics (TC) 164. The Composition Information (CI) 162 includes information about a relationship between the MMT assets 150.

The Composition Information (CI) 162 may further include information indicative of a relationship between a plurality of MMT packages if a single piece of content is formed of a plurality of MMT packages. The Composition Information (CI) 162 may include information about a temporal, spatial, and adaptive relationship within a MMT package.

Like information that helps the delivery and presentation of a MMT package, the Composition Information (CI) in MMT provides information about a spatial and temporal relationship between MMT assets within a MMT package.

The MMT-Composition Information (CI) is a descriptive language that is extended from HTML5 and provides such information. If HTML5 has been designed to describe the page-based presentation of text-based content, the MMT-CI chiefly presents a spatial relationship between sources. In order to support presentation indicative of a temporal relationship between MMT assets, the MMT-CI may be extended to have information related to an MMT asset within a MMT package, such as presentation resources, time information that determines the delivery and consumption sequence of MMT assets, and the additional attributes of media elements which consume various types of MMT assets in HTML5.

The TC information 164 includes information about TC and may provide information necessary to determine delivery conditions on each MMT asset (or a MMT package). The Transport Characteristics (TC) information may include a traffic description parameter and a QoS descriptor.

The traffic description parameter may include information about the bit rate of an MFU 130 or an MPU, information about the priority of an MFU 130 or an MPU, etc. The bit rate information may include, for example, information regarding whether an MMT asset is a Variable Bit Rate (VBR) or a Constant Bit Rate (CBR), a bit rate guaranteed, for an MFU (or an MPU), and a maximum bit rate of an MFU (or an MPU). The traffic description parameter may be used for resources reservation between servers, clients, and other elements on a delivery path, and it may include, for example, information about a maximum size of an MFU (or an MPU) within an MMT asset. The traffic description parameter may be updated periodically or aperiodically.

A QoS descriptor includes information for QoS control and may include, for example, delay information and loss information. The loss information may include, for example, a loss indicator regarding whether or not the delivery loss of an MMT asset is permitted. For example, the loss information may indicate 'lossless' if the loss indicator is '1' and may indicate 'lossy' if the loss indicator is '0'. The delay information may include a delay indicator used to distinguish the sensitivity of delivery delay of an MMT asset. The delay indicator may indicate whether the type of MMT asset is conversational, interactive, real-time, or non-real-time.

A single piece of content may be made up of a single MMT package. Alternatively, a single piece of content may be made up of a plurality of MMT packages.

If a single piece of content is made up of a plurality of MMT packages, composition information or configuration information indicative of a temporal, a spatial, adaptive relationship between the plurality of MMT packages may be present within a single MMT package that belongs to the MMT packages or may be present outside the MMT packages.

For example, in the case of hybrid delivery, some of content components may be delivered over a broadcast network, and the remaining parts of the content components may be delivered over a broadband network. For example, in the case of a plurality of AV streams that forms a single multi-view service, a single stream may be delivered over a broadcast network, the remaining streams may be delivered over a broadband network, and the AV streams may be multiplexed, individually received by a client terminal, and stored. Alternatively, for example, application software, such as a widget, may be delivered over a broadband network, and an AV stream (or an AV program) may also include a scenario that is delivered over an existing broadcast network.

In the case of such a multi-view service scenario and/or a widget scenario, all of a plurality of AV streams may become a single MMT package. In such a case, one of the plurality of AV streams may be stored only in a single client terminal, the storage content becomes the part of the MMT package, the client terminal needs to rewrite composition information or configuration information, and the rewritten content becomes a new MMT package not related to a server.

In the case of such a multi-view service scenario and/or a widget scenario, each AV stream may become a single MMT package. In such a case, a plurality of MMT packages forms a single piece of content, the plurality of MMT packages is recorded in storage in a MMT package unit, and composition information or configuration information indicative of a relationship between the MMT packages is required.

Composition information or configuration information included in a single MMT package may refer to an MMT asset within another MMT package and also may present the outside of a MMT package that refers to a MMT package in an out-band situation.

Meanwhile, in order to notify a client terminal of a list of the MMT assets 150 provided by a service provider and an available path along which the MMT packet 160 is delivered, the MMT packet 160 may be translated into service discovery information through the S layer, so an information table for service discovery may be included in a MMT control message.

A server which has fragmented multimedia content into a plurality of segments assigns pieces of URL information to the plurality of segments fragmented in a specific number, stores the pieces of URL information about the respective segments in a media information file, and sends the media information file to a client.

The media information file may be called various names, such as 'Media Presentation Description (MPD)' or a 'manifest file', depending on standardization organizations that standardize HTTP streaming. The media information file is named and described as the MPD.

Figure 3:
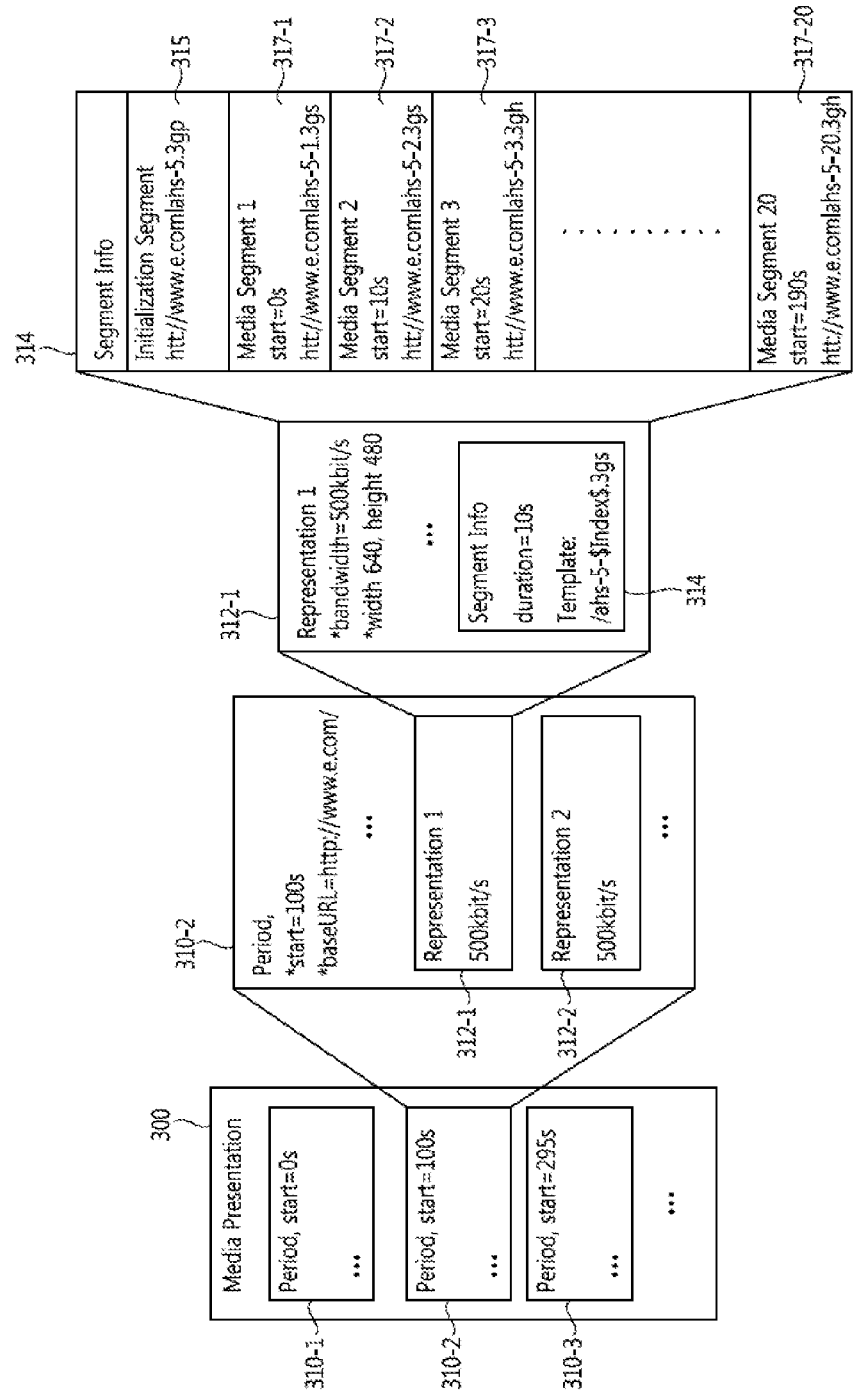
FIG. 3 is a conceptual diagram showing the structure of a Media Presentation Description (MPD) regulated in the DASH standard.

FIG. 3 is a conceptual diagram showing the structure of a Media Presentation Description (MPD) regulated in the DASH standard.

The MPD 300 consists of one or more periods 310-1, 310-2, 310-3, . . . , each of the periods includes start time information, and period elements are physically arranged in ascending powers of the start times within the MPD for duration of the period. Although not shown in FIG. 3, each period may include at least one adaptive set. The adaptive set includes one or more representations 312-1, 312-2, . . . . A single adaptive set may include the replaceable encoding of at least one media content component.

All representations included in a single adaptive set indicate media content components. As a result, all the representations include a media stream.

The representations are described as representation elements, and the representation elements are included in an adaptive set element. During a predetermined period, the entire set of or a subset of media content components including media content may become the representations. A single representation may include one or more segments. FIG. 3 shows an example in which a representation 1 consists of 20 segments 317-1, 317-2, 317-3, . . . , 317-20. Each representation includes an initialization segment, and each of media segments within the representation may be self-initialized.

Each representation may include segment information 314, and the segment information 314 includes duration and template information.

Figure 4:
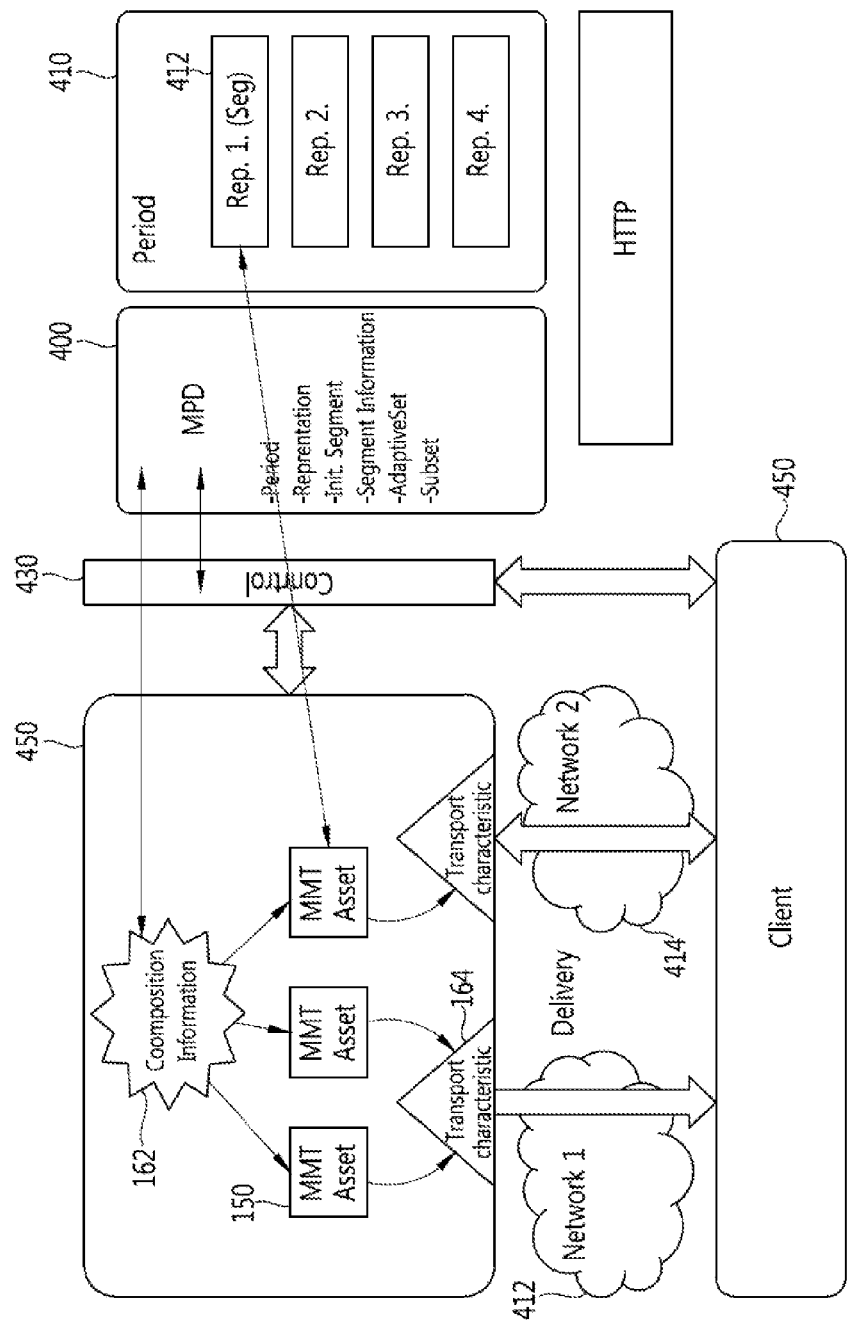
FIG. 4 is a conceptual diagram showing an interoperating mechanism for supporting the transport of DASH content under a MMT protocol.

FIG. 4 is a conceptual diagram showing an interoperating mechanism for supporting the transport of DASH content under a MMT protocol.

Referring to FIG. 4, period information and supplementary information (information about a language, a media component type, viewpoint properties, and multi-view properties for grouping within an adaptive set), such as duration within a MPD, may be described in configuration information within a MMT package. In this case, the configuration information may include package identification information, composition information, and an information table for service discovery within MMT control information. The composition information 162 includes information about a temporal, spatial, and adaptive relationship within the MMT package.

The properties of a representation, such as a bandwidth, may be described within MMT asset information 152 including information about a media identification, a media type, and a media size. A media segment in the DASH standard may include information, such as a segment index, a brand type, and a sub-segment index. Information about the media segment in the DASH standard may be described as supplementary information, such as the type of MPU 140, the identification of the MFU 130, the MPU 140, and the MFU 130. Alternatively, for interoperability between DASH and MMT, information about the MPD of DASH may also be described in a MMT packet payload.

A method for interoperating DASH in which media data is transmitted over HTTP and MMT in which media data is transmitted using a hybrid network (a broadcast network and a broadband network) is described in detail below.

If the MPD of DASH and the configuration information of MMT, and the supplementary information of the MFU and the MPU of MMT, or a MMT packet payload is used for interoperability between DASH and MMT as described above, a service provider may store linked data in which the MPD of DASH and the Service Information Configuration Information Table (SICTT) of MMT, and an MMT Asset Configuration Information Table (MACIT) are mutually linked in a content providing server. That is, for such interoperability between DASH and MMT, information corresponding to the MPD of DASH may be stored in the composition information of MMT, and the supplementary information of an MFU and the MPU of MMT as described above. The information corresponding to the MPD of DASH for interoperability between DASH and MMT is hereinafter defined as MPD interoperability information.

The SICTT and the MACIT are illustrated in Table 1 and Table 2 and are tables managed in the MMT S layer. Service configuration information and MMT asset configuration information are managed in the SICTT and the MACIT, respectively. Table 1 shows the Service Information Configuration Information Table (SICTT), and Table 2 shows the MMT Asset Configuration Information Table (MACIT).

That is, for interoperability between DASH and MMT, information about the MPD of DASH may be interoperated to the SICTT of Table 1, that is, a service configuration information table managed in the MMT S layer, and to the MACIT of Table 2, that is, an MMT asset configuration information table and stored.

TABLE 1

| Service Information Configuration Information Table | | |
|---|---|---|
| Table ID | | |
| version info | | |
| SICIT info | Starting Time | |
| | Repetition Period | |
| | Server URL | |
| Information Table Info | information table 1 | IT ID |
| | | Version |
| | | transmission time |
| | | Repetition period |
| | | Location |
| | | 2nd location |
| | Information table 2 | IT ID |
| | | Version |
| | | transmission time |
| | | Repetition period |
| | | Location |
| | | 2nd location |
| | Information table n | IT ID |
| | | Version |
| | | transmission time |
| | | Repetition period |
| | | Location |
| | | 2nd location |

TABLE 2

| MMT Asset Configuration Information Table | | |
|---|---|---|
| Table ID | | |
| version info | | |
| MACIT Transmission Time info (Optional) | StartTime | |
| | Retransmisison period | |
| MMT ASSET ID | ID | |
| Required Device Capabilities (optional) | To be determined | |
| Component Relation Info | | |
| Component Info | Component1 Info | Component ID |
| | | Component type |
| | . . . | Component ID |
| | | Component type |
| | Component n info | Component ID |
| | | Component type |

Figure 5:
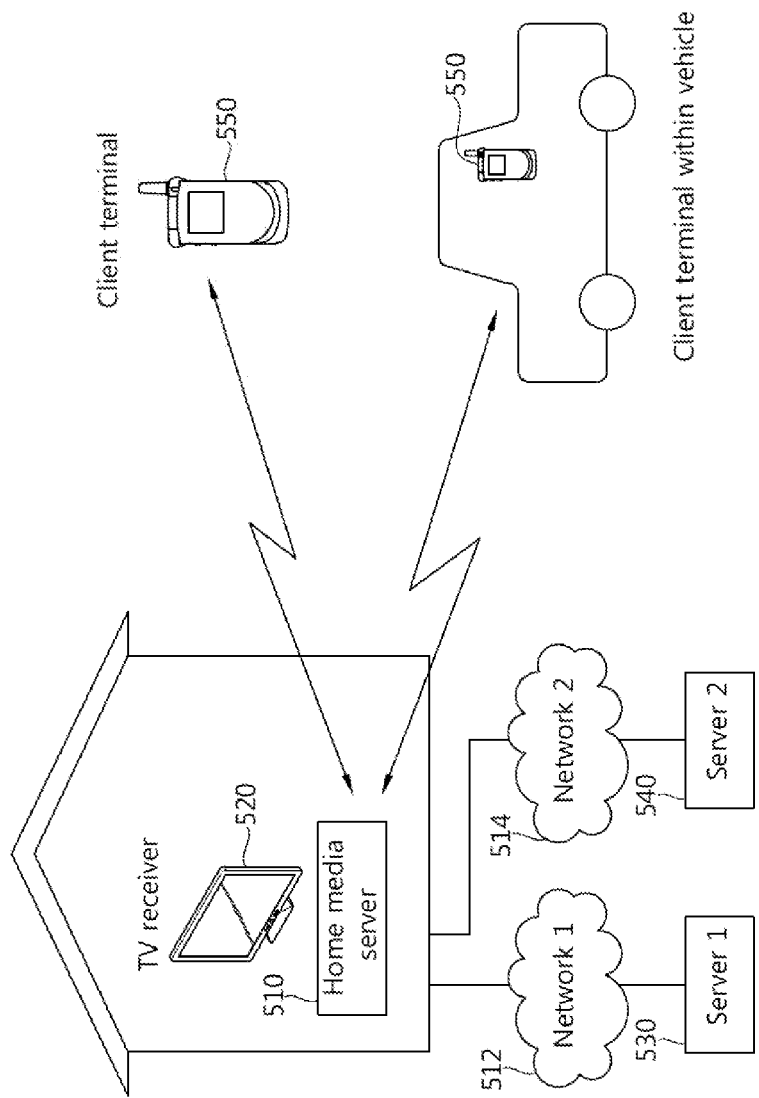
FIG. 5 is a conceptual diagram illustrating the interoperating scenario of MMT and DASH in which content transmitted through MMT is transmitted as DASH content in the case of hybrid delivery in accordance with an embodiment of the present invention.

FIG. 5 is a conceptual diagram illustrating the interoperating scenario of MMT and DASH in which content transmitted through MMT is transmitted as DASH content in the case of hybrid delivery in accordance with an embodiment of the present invention.

For example, FIG. 5 describes the interoperating scenario of MMT and DASH in which content (or media) transmitted through MMT—for example, content (or media) of UHD resolution—is transmitted as DASH content (or media) in the form of hybrid delivery in which an AV stream is transmitted by a server 1 530 over a first network 512 and broadcasting supplementary information, such as widgets or titles, is transmitted by a server 2 540 over a second network Referring to FIG. 5, if a user watches content (or media) transmitted through MMT—for example, UHD broadcasting content—using a large-screen TV receiver 520 at home and goes out due to an appointment, the user may receive MPD information from a home media server 510, and the user may watch content (or media) transmitted through MMT—for example, UHD broadcasting content—that the user watched at home from a part at which the user's watching was stopped or a part that the user wants to watch using DASH through his portable client terminal 550, such as a smart phone, when riding on a vehicle or outside his home while going out.

In this case, the interoperating scenario of MMT and DASH includes two scenarios: a scenario using DASH content while using content transmitted through MMT and a scenario using content used through DASH as MMT content.

The first scenario is a scenario using DASH content while using content transmitted through MMT. In such a case, MPD information is transmitted to the portable client terminal (refer to FIGS. 6 and 8) or the DASH transport server (refer to FIG. 7).

The second scenario is a scenario using content, used through DASH, as MMT content. In such a case, MPD information may be transmitted from the portable client terminal to the integration type TV receiver, the home media server 510, the MMT transport server, or the content providing server of a service provider. Alternatively, the MPD information may be transmitted from the content providing server of the service provider to the integration type TV receiver, the home media server 510, the MMT transport server, or the content providing server of the service provider.

Figure 6:
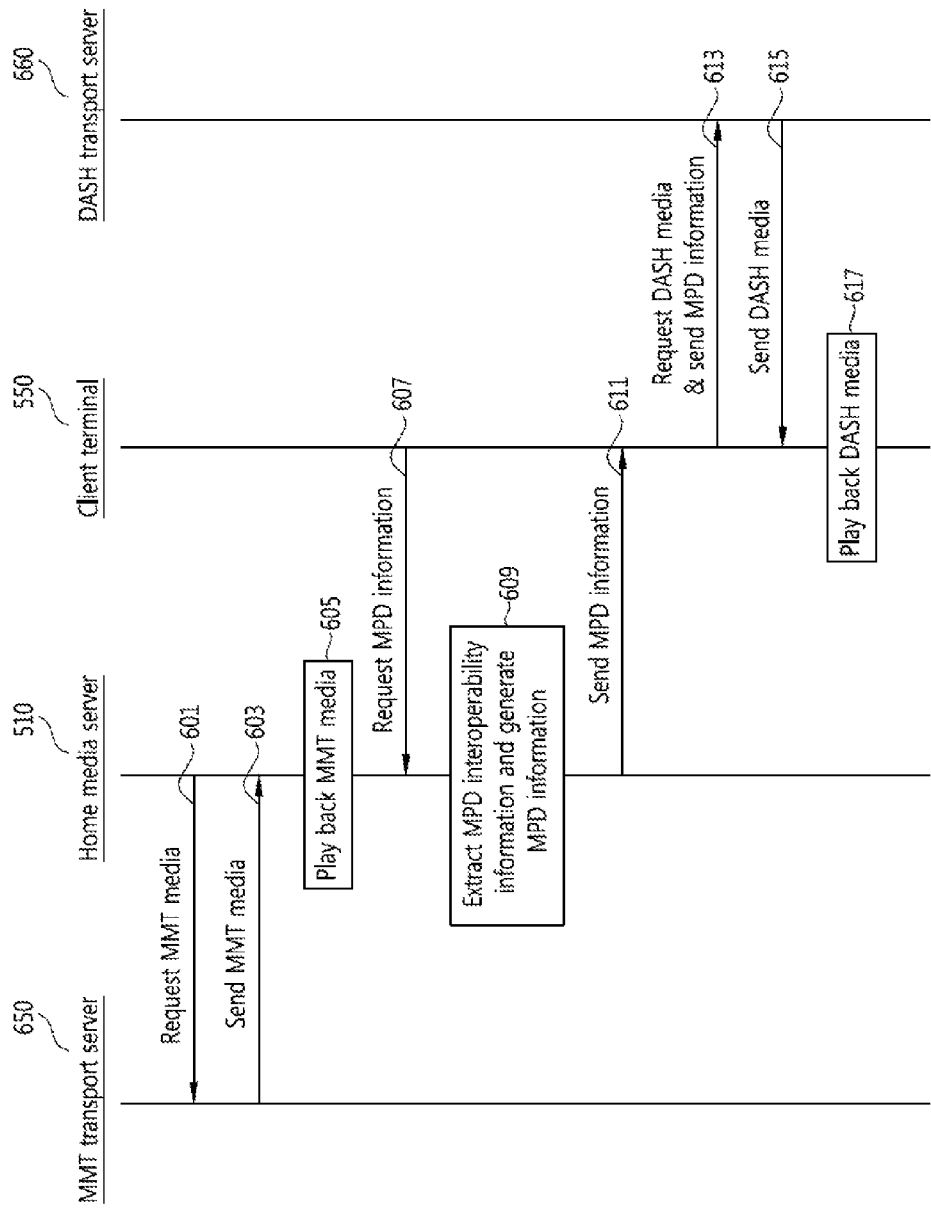
FIG. 6 is a flowchart illustrating a method for transmitting content, transmitted through MMT, as DASH content under the interoperating scenario of MMT and DASH in accordance with an embodiment of the present invention.

FIG. 6 is a flowchart illustrating a method for transmitting content, transmitted through MMT, as DASH content under the i interoperating scenario of MMT and DASH in accordance with an embodiment of the present invention.

Referring to FIG. 6, first, the home media server 510 requests the transport of MMT media from the MMT transport server 650 (step 601). In response thereto, the MMT transport server 650 sends the MMT media to the home media server 510 (step 603). The MMT media is content (or media) transmitted through MMT. For example, UHD broadcasting content may become the MMT media. The home media server 510 is used as a meaning that includes both a home media playback device and an integration type TV receiver in addition to a home media server.

The home media server 510 receives the MMT media and plays back the MMT media (step 605).

When the home media server 510 receives a request for MPD information from the portable terminal 550 (step 607), the home media server 510 extracts MPD interoperability information, generates the MPD information (step 609), and then sends the MPD information to the portable terminal 550 (step 611).

Alternatively, the home media server 510 sends a list of the MMT media to the portable terminal 550. When a user selects content (or media) to be played back from the list of MMT media, the portable terminal 550 may send a request for MPD information about the selected MMT media to the home media server 510.

After step 611, the portable terminal 550 requests DASH media from a DASH transport server 660 and sends the MPD information to the DASH transport server 660 (step 615). In this case, the DASH media is content (or media) transmitted through DASH.

In response to the request, the DASH transport server 660 sends the DASH media to the portable terminal 550 using the MPD information (step 615). The portable terminal 550 plays back the DASH media (step 617).

The portable terminal 550 receives information about the position where content (or media) being watched at home was stopped from the home media server 510, and thus the user may continue to watch the content (or media) from the position where the content (or media) being watched at home was stopped. Alternatively, the user may select a desired position using the portable terminal 550, and the portable terminal 550 may play back the content (or media) that was being watched at home.

In FIG. 6, the home media server 510 has been illustrated as generating MPD information and sending the MPD information to the portable terminal 550, but the MPD information may be generated by an additional server outside a house and transmitted to the portable terminal 550. The additional server outside the house is a server for managing MPD interoperability information and may be a MPD generation server of FIG. 8. The server for managing the MPD interoperability information may be the content providing server of a service provider. Alternatively, if a TV receiver and a set-top box within a house are integrated, the MPD information may be generated by the integration type TV receiver and may be directly transmitted to a portable terminal. Alternatively, the MPD information may generated by a portable terminal with which MPD interoperability information has been supplied (refer to FIG. 7).

In FIG. 6, the MMT media transport apparatus has been illustrated as sending the MPD information to the portable terminal, but the portable terminal may directly access the integration type TV receiver, the home media server 510, or an additional server outside a house, such as the content providing server of a service provider and download the MPD information.

FIG. 7 is a flowchart illustrating a method for transmitting content, transmitted through MMT, as DASH content under the interoperating scenario of MMT and DASH in accordance with another embodiment of the present invention.

Referring to FIG. 7, first, the home media server 510 requests the transport of MMT media from the MMT transport server 650 (step 701). In response thereto, the MMT transport server 650 sends the MMT media to the home media server 510 (step 703). The MMT media is content (or media) transmitted through MMT. For example, UHD broadcasting content may become the MMT media.

The home media server 510 receives the MMT media and plays back the MMT media (step 705).

When a request for MPD information is received from the portable terminal 550 (step 707), the home media server 510 extracts MPD interoperability information (step 709) and sends the MPD interoperability information to the portable terminal 550 (step 711).

Alternatively, the home media server 510 may send a list of MMT media to the portable terminal 550. When a user selects content (or media) to be played back from the list of MMT media, the portable terminal 550 may send a request for MPD information about the selected MMT media to the home media server 510.

After step 711, the portable terminal 550 generates MPD information using the received MPD interoperability information (step 713).

The portable terminal 550 requests DASH media from the DASH transport server 660 and sends the MPD information to the DASH transport server 660 (step 715). In this case, the DASH media is content (or media) transmitted through DASH.

In response to the request, the DASH transport server 660 sends the DASH media to the portable terminal 550 using the MPD information (step 717), and the portable terminal 550 plays back the DASH media (step 717).

The portable terminal 550 receives information about the position where content (or media) being watched at home was stopped from the home media server 510, and thus the user may continue to watch the content (or media) from the position where the content (or media) being watched at home was stopped. Alternatively, the user may select a desired position using the portable terminal 550, and the portable terminal 550 may play back the content (or media) that was being watched at home.

FIG. 8 is a flowchart illustrating a method for transmitting content, transmitted through MMT, as DASH content under the interoperating scenario of MMT and DASH in accordance with yet another embodiment of the present invention.

Referring to FIG. 8, first, the home media server 510 requests the transport of MMT media from the MMT transport server 650 (step 801). In response thereto, the MMT transport server 650 sends the MMT media to the home media server 510 (step 803). The MMT media is content (or media) transmitted through MMT. For example, UHD broadcasting content may become the MMT media.

The home media server 510 receives the MMT media and plays back the MMT media (step 805).

When the home media server 510 receives a request for MPD information from the portable terminal 550 (step 807), the home media server 510 extracts MPD interoperability information (step 809) and sends the MPD interoperability information to the portable terminal 550 (step 811).

Alternatively, the home media server 510 may send a list of MMT media to the portable terminal 550. When a user selects content (or media) to be played back from the list of MMT media, the portable terminal 550 may send a request for MPD information about the selected MMT media to the home media server 510.

After step 811, the portable terminal 550 sends the request for the MPD information and the MPD interoperability information to an external server—for example, a MPD generation server 670-(step 813). In this case, the external server may be a content providing server or the MPD generation server 670 capable of generating additional MPD information.

The MPD generation server 670 generates the MPD information using the received MPD interoperability information (step 815) and sends the MPD information to the portable terminal 550 (step 817).

The portable terminal 550 requests DASH media from the DASH transport server 660 and sends the MPD information to the DASH transport server 660 (step 819). In this case, the DASH media is content (or media) transmitted through DASH.

In response to the request, the DASH transport server 660 sends the DASH media to the portable terminal 550 using the MPD information (step 821). The portable terminal 550 plays back the DASH media (step 823).

The portable terminal 550 receives information about the position where content (or media) being watched at home was stopped from the home media server 510, and thus the user may continue to watch the content (or media) from the position where the content (or media) being watched at home was stopped. Alternatively, the user may select a desired position using the portable terminal 550, and the portable terminal 550 may play back the content (or media) that was being watched at home.

In accordance with the method for interoperating MMT media and DASH media, MPD interoperability information indicative of a interoperability relationship between MMT media and DASH media is linked to the SICTT, that is, a service configuration information table managed in the MMT S layer, and the MACIT, that is, an MMT asset configuration information table and stored. Accordingly, in a scenario in which MMT media and DASH media are interoperated, interoperability between the MMT media and the DASH media can be performed.

What is claimed is:

1. A method for interoperating MMT(MPEG Multimedia Transport) media and DASH(Dynamic Adaptive Streaming over HTTP) media, comprising steps of:
generating, by a home media server, MPD(Media Presentation Description) information by extracting MPD interoperability information of media transmitted through MMT from a MMT transport server, wherein the MPD interoperability information is information corresponding to a MPD of DASH for interoperability between DASH and MMT; and
sending the MPD information to a portable terminal so that the portable terminal plays back the MMT media as DASH media using the MPD information.

2. The method of claim 1, wherein the MPD interoperability information is linked to a Service Information Configuration Information Table (SICTT) that is a service configuration information table and an MMT Asset Configuration Information Table (MACIT) that is an MMT asset configuration information table which are managed in a MMT S layer (Signalling layer), and stored.

3. The method of claim 1, wherein the information corresponding to a MPD of DASH is included in at least one of a configuration information, a supplementary information of the MPU(Media Processing Unit) and MFU(Media Fragment Unit), and MMT packet payload of MMT.

4. The method of claim 3, wherein the configuration information of MMT includes information that corresponds a period information and a supplementary information of the MPD,
wherein the supplementary information of the MPD includes information about a language, a media component type, viewpoint properties, and multi-view properties.

5. A method for interoperating MMT(MPEG Multimedia Transport) media and DASH(Dynamic Adaptive Streaming over HTTP) media, comprising steps of:
receiving, by a portable terminal, MPD(Media Presentation Description) interoperability information of media transmitted through MMT and extracted by a home media server, wherein the MPD interoperability information is information corresponding to a MPD of DASH for interoperability between DASH and MMT;
generating, by the portable terminal, MPD information using the MPD interoperability information; and
playing back, by the portable terminal, the MMT media as DASH media using the MPD information.

6. The method of claim 5, further comprising:
sending, by the portable terminal, a MPD request to the home media server; or
sending, by the portable terminal, a MPD request for a selected MMT media to the home media server by selecting a MMT media to be played back from MMT media list received from the home media server.

7. The method of claim 5, further comprising:
controlling to continue to watch the MMT media from position where the MMT media being watched was stopped, by receiving information about the position where MMT media being watched was stopped, from the home media server.

8. The method of claim 5, wherein playing back, by the portable terminal, the MMT media as DASH media using the MPD information comprising:
sending, by the portable terminal, the MPD information to DASH transport server, requesting the DASH media;
sending, by the DASH transport server, the DASH media to the portable terminal, corresponding the DASH media request and using the MPD information.

9. A method for interoperating MMT(MPEG Multimedia Transport) media and DASH(Dynamic Adaptive Streaming over HTTP) media, comprising steps of:
receiving, by a portable terminal, MPD(Media Presentation Description) interoperability information of media transmitted through MMT and extracted by a home media server, wherein the MPD interoperability information is information corresponding to a MPD of DASH for interoperability between DASH and MMT;
sending, by the portable terminal, the received MPD interoperability information to an external server;
generating, by the external server, MPD information using the MPD interoperability information and sending the generated MPD information to the portable terminal; and
playing back, by the portable terminal, the MMT media as DASH media using the MPD information.

10. The method of claim 9, wherein the external server is a server managing MPD interoperability information and is content providing server of a service provider, or an integration type TV receiver or a home media server.

11. The method of claim 9, further comprising:
sending, by the portable terminal, a MPD request to the home media server; or
sending, by the portable terminal, a MPD request for a selected MMT media to the home media server by selecting content to be played back from MMT media list received from the home media server.

12. The method of claim 9, further comprising:
controlling to continue to watch the MMT media from position where the MMT media being watched was stopped, by receiving information about the position where MMT media being watched was stopped, from the home media server.

13. The method of claim 9, wherein playing back, by the portable terminal, the MMT media as DASH media using the MPD information comprising:
sending, by the portable terminal, the MPD information to DASH transport server, requesting the DASH media;
sending, by the DASH transport server, the DASH media to the portable terminal, corresponding the DASH media request and using the MPD information.

* * * * *